US006468381B1

(12) United States Patent
Morgan (10) Patent No.: US 6,468,381 B1
(45) Date of Patent: Oct. 22, 2002

(54) METHOD OF MAKING A GOLF BALL AND GOLF BALL COMPRESSION MOLD

(75) Inventor: Megan Morgan, Newport, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/323,129

(22) Filed: Jun. 1, 1999

(51) Int. Cl.[7] ............................................... B29C 43/18
(52) U.S. Cl. .................. 156/244.19; 156/245; 156/293; 264/248; 264/275; 264/279.1; 264/297.5; 264/297.8; 425/408; 425/411; 425/414; 425/423
(58) Field of Search ............................. 264/248, 275, 264/279.1, 297.5, 297.8, 138, 254, 255; 425/408, 411, 414, 423; 156/293, 244.19, 245

(56) References Cited

U.S. PATENT DOCUMENTS

| | | | |
|---|---|---|---|
| 1,202,318 A | 10/1916 | Roberts | |
| 2,726,925 A | 12/1955 | Saulino | 18/59 |
| 4,130,619 A | 12/1978 | Held | 264/162 |
| 4,508,309 A | 4/1985 | Brown | 249/81 |
| 4,558,499 A | 12/1985 | Brown | 29/157 |
| 4,757,972 A | 7/1988 | Brown | 249/81 |
| 4,895,293 A | 1/1990 | Brown | 228/182 |
| 5,150,906 A | 9/1992 | Molitor et al. | 273/220 |
| 5,683,312 A | 11/1997 | Brown | 473/354 |
| 5,919,100 A | 7/1999 | Boehm et al. | 473/354 |
| 6,036,907 A | 3/2000 | Tanaka et al. | 264/250 |

FOREIGN PATENT DOCUMENTS

AU          28623/97          11/1997

Primary Examiner—Jan H. Silbaugh
Assistant Examiner—Edmund H. Lee
(74) Attorney, Agent, or Firm—Swidler Berlin Shereff Friedman, LLP

(57) ABSTRACT

The present invention is an improved method for making a golf ball. Two cups are molded from an elastomer separately from a center. The cups are molded on both sides of a center mold plate with hemispherical protrusions having a channel circumventing the protrusions to capture excess cup material. The material in the channel aids in centering of the hemispherical cavity and allows the reduction or elimination of reinforcing polymer material. The protrusions force the elastomer cup material into cavities in outer mold plates on either side of the center mold plate, thus forming cups with cavities. The solid or fluid-filled center is placed within the cup cavities, and the cups are joined, preferably by raising the temperature of the mold above the cure activation temperature of the cup material.

53 Claims, 10 Drawing Sheets

METHOD OF MAKING A GOLF BALL AND GOLF BALL COMPRESSION MOLD

FIELD OF THE INVENTION

The present invention is directed to an improved method of compression molding a multi-layered golf ball core.

BACKGROUND OF THE INVENTION

Generally, golf balls have been classified as solid balls or wound balls. Solid balls are typically comprised of a solid, polymeric core and a cover. These balls are generally easy to manufacture, but are regarded as having non-optimal or limited playing characteristics. Wound balls are comprised of a solid or liquid-filled center surrounded by tensioned elastomeric material and a cover. Wound balls generally have good playing characteristics, but are more difficult to manufacture than solid balls.

The prior art is comprised of various golf balls that have been designed to provide optimal playing characteristics. These characteristics include the initial velocity and spin of the golf ball, which can be optimized for various caliber of players. For instance, certain players prefer to play a ball that is softer feeling and have a high spin rate that allows the player to control or "work" the ball. However, balls of this nature tend to exhibit slight decrease in distance due to the high spin rate. Other players prefer to play a ball that has a low spin rate to maximize distance. These balls, however, tend to be hard feeling and difficult to control around the greens.

Methods for producing golf balls having an ideal combination of the above mentioned desirable characteristics have been many. Manufacturers have molded layers around a solid center by placing a preformed center between two blocks of core material in a spherical compression mold, and closing the mold. This process, however, provides little control over the ultimate placement of the center within the golf ball core. Large variations in the location of the center can result and are extremely detrimental to ultimate golf ball performance. Another method that improves the centering of a solid center involves forming two hemispherical polymer cups with two mold halves that, when placed together, create a hollow cavity in which the solid center rests. The two cups are then heated above the curing temperature of the polymeric material, under compression, to form the golf ball core. However, although centering is improved, at certain desirable temperatures (typically higher) and material compositions (low levels of reinforcing polymer), the cups tend to pull away from the surface of the molds, which can result in a slightly off-center solid center because of displaced shell material.

The prior art also provides for the manufacture of double cover golf balls. This is generally accomplished by injection molding a first cover layer followed by a second cover layer, both around a core. This system, however, requires complex injection molds, usually with retractable pins within the mold to properly position the core. Moreover, this system generally works better with and is, therefore, more ideally suited for use with thermoplastic materials.

Therefore, what is desired is an improved method of molding multi-layer cores that employs a center plate for compression molding that ensures properly centered cores, allows cup or mantle layer formation at higher temperatures, and allows the use of improved formulations by reducing the amount of reinforcing polymer required.

SUMMARY OF THE INVENTION

The invention provides a method for making a golf ball, particularly suited for golf balls that have a multi-layer core with a solid or fluid center. The method comprises forming a solid or fluid-filled center, and then molding from elastomeric material, preferably of a thermoset material such as a polybutadiene-based material, core parts, such as hemispherical cups, that when combined form a hollow sphere.

The hemispherical cups each have a hemispherical cavity, formed by a combination of a first mold plate having a hemispherical cavity and a second mold plate with a hemispherical protrusion. The first mold plate cavity has a cavity diameter and, additionally, a circumferential groove surrounding the cavity, the groove having an inner and outer diameter. The inner diameter of the groove is preferably greater than the cavity diameter in the first mold plate. The second mold plate has a channel disposed concentrically around the hemispherical protrusion, the channel having an inner, outer, and center diameter. The channel inner diameter is preferably less than the cavity diameter. Additionally, the channel outer diameter is greater than inner groove diameter on the first mold plate.

The hemispherical cups are formed from elastomeric material by placing a predetermined amount of the material in the cavity of the first mold plate, locating the second mold plate juxtaposed to the first plate, and compressing the mold plates to form a cup, having a substantially hemispherical cavity and a lip extending into the groove on the first mold plate. The center is placed between the cups. The cups are then joined around the center to form a substantially spherical core with a substantially concentric center. Since the lip maintains the cups uniformly thick shape, the center is positioned concentrically within the finished core. Finally, a cover is molded around the core.

In one embodiment, the channel has a center diameter that is substantially the same as the cavity diameter. The channel has a depth that is preferably greater than about 0.01 inches. More preferably, the depth is from about 0.01 to 0.05 inches. Most preferably, the depth is from about 0.02 to 0.03 inches. In another embodiment, the channel inner diameter is between about 55% and 99.5% of the cavity diameter. The channel outer diameter is preferably between about 100.5% and 105% of the groove inner diameter.

The channel has a first and second sidewall, each having angles that are less than 90 degrees from horizontal, as measured from the center of the channel. More preferably, the angle is from about 30 to 60 degrees from horizontal. Most preferably, the angle is from about 40 to 50 degrees from horizontal. The channel, therefore, can be defined, in one embodiment, by a truncated cone cross-section. In another embodiment, the first and second sidewalls are each defined by an arc having a radius.

Additionally, the channel has a top width and a bottom width smaller than the top width. The bottom width is preferably from about 0.1 to 0.15 inches. More preferably, the bottom width is from about 0.12 to 0.13 inches.

In a preferred method according to the invention, the two cups are a thermoset material and the step of joining the cups comprises elevating the temperature of the cups to cause cross-linking. In the step of joining the cups further comprises compressing the cup edges together when crosslinking to join the cups.

The present invention also discloses a mold for making a golf ball having a multi-layer core comprising a bottom mold plate with a plurality of hemispherical cavities having a cavity diameter and a circumferential groove surrounding each cavity having an inner and outer diameter, the inner diameter being greater than the cavity diameter; a top mold plate with a plurality of hemispherical cavities having a cavity diameter and a circumferential groove surrounding each cavity having an inner and outer diameter, the inner diameter being greater than the cavity diameter; and a center mold plate with a plurality of hemispherical protrusions and a corresponding channel disposed concentrically around the protrusions, the channel having an inner diameter being less than the cavity diameter and an outer diameter greater than the groove inner diameter.

In a preferred method, the mold above is used to form a plurality of core hemispherical cups from elastomeric material by placing the elastomeric material in the cavities of the bottom mold plate and the top mold plate, locating the center mold plate between the top mold plate and the bottom mold plate; and compressing the mold plates to form the cups in the bottom and top mold plate cavities, the cups having substantially hemispherical cavities and a lip extending into the groove such that the lips are coupled to the cups to maintain the cups shape. The center mold plate is removed from between the top and bottom mold plates. The solid or fluid centers are placed in the cups in the top mold plate and the bottom mold plate is located over the top mold plate. Two cups are joined around the centers to form substantially spherical cores and a cover is molded around the cores.

In a one embodiment, the channel has a center diameter that is substantially the same as the cavity diameter. The channel has a depth that is preferably greater than about 0.01 inches. More preferably, the depth is from about 0.01 to 0.05 inches. Most preferably, the depth is from about 0.02 to about 0.03 inches. In another embodiment, the channel inner diameter is between about 95% and 99.5% of the cavity diameter. The channel outer diameter is also preferably between about 100.5% and 105% of the groove inner diameter.

The channel has a first and second sidewall that converge toward the center of the channel, each having angles that are less than 90 degrees from horizontal. More preferably, the angles are from about 30 to 60 degrees from horizontal. Most preferably, the angles are from about 40 to 50 degrees from horizontal. The channel, therefore, can be defined, in one embodiment, by a truncated cone cross-section. In another embodiment, the first and second sidewalls are each defined by an arc having a radius.

Additionally, the channel has a top width and a bottom width smaller than the top width. The bottom width is preferably from about 0.1 to 0.15 inches. More preferably, the bottom width is from about 0.12 to 0.13 inches.

In a preferred method according to the invention, the bottom mold plate is coupled to the center mold plate and the top mold plate. To mold the cups, the center mold plate is folded over the top mold plate. Subsequently, the top mold plate and the center mold plate are folded over the bottom mold plate. The plates are then compressed to form the cups.

In one embodiment, the center mold plate further includes providing hemispherical protrusions that are substantially the same size. Alternatively, the hemispherical protrusions are replaceably connected to the center mold plate.

In one embodiment, the step of compressing the mold plates further includes elevating the temperature of the elastomeric material to a first temperature that is less than the cure activation temperature of the material so that the material becomes pliable. Then, the step of joining the cups includes elevating the temperature of the material to a second temperature greater than the cure activation temperature to crosslink the material.

The present invention is further directed to an apparatus for molding a sphere having a center and a shell, the apparatus comprising a bottom mold plate with a plurality of hemispherical cavities having a cavity diameter and a circumferential groove surrounding each cavity having an inner and outer diameter, the inner diameter being greater than the cavity diameter, a top mold plate with a plurality of hemispherical cavities having the same cavity diameter and a circumferential groove surrounding each cavity having the same inner and outer diameter, and a center mold plate with a plurality of hemispherical protrusions and a corresponding channel disposed concentrically around the protrusions, the channel having an inner diameter being less than the cavity diameter and an outer diameter greater than the groove inner diameter.

In one embodiment, the channel has a center diameter that is substantially the same as the cavity diameter. The channel has a depth that is preferably greater than about 0.01 inches. More preferably, the depth is from about 0.01 to 0.05 inches. Most preferably, the depth is from about 0.02 to 0.03 inches. In another embodiment, the channel inner diameter is between about 55% and 99.5% of the cavity diameter. The channel outer diameter is preferably between about 100.5% and 105% of the groove inner diameter.

In another embodiment, the channel has a first and second sidewall, each having angles that are less than 90 degrees from horizontal, as measured from the center of the channel. More preferably, the angle is from about 30 to 60 degrees from horizontal. Most preferably, the angle is from about 40 to 50 degrees from horizontal. The channel, therefore, can be defined, in one embodiment, by a truncated cone cross-section. In another embodiment, the first and second sidewalls are each defined by an arc having a radius.

In a further embodiment, the channel has a top width and a bottom width smaller than the top width. The bottom width is preferably from about 0.1 to 0.15 inches. More preferably, the bottom width is from about 0.12 to 0.13 inches.

DESCRIPTION OF THE PREFERRED EMBODIMENTS

Figure 1:
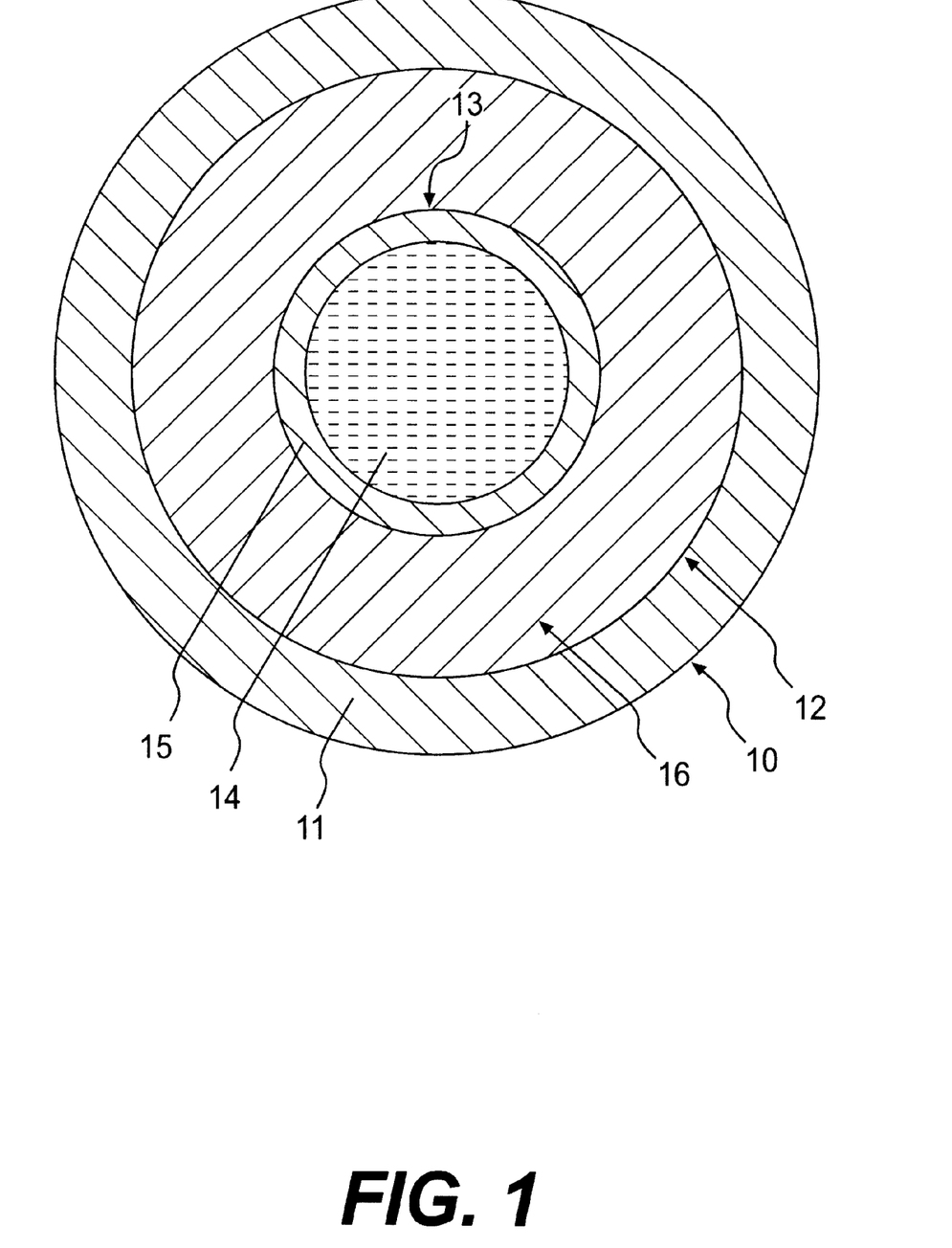
FIG. 1 is a sectional view of a liquid filled ball made according to the method of the present invention.
Figure 2:
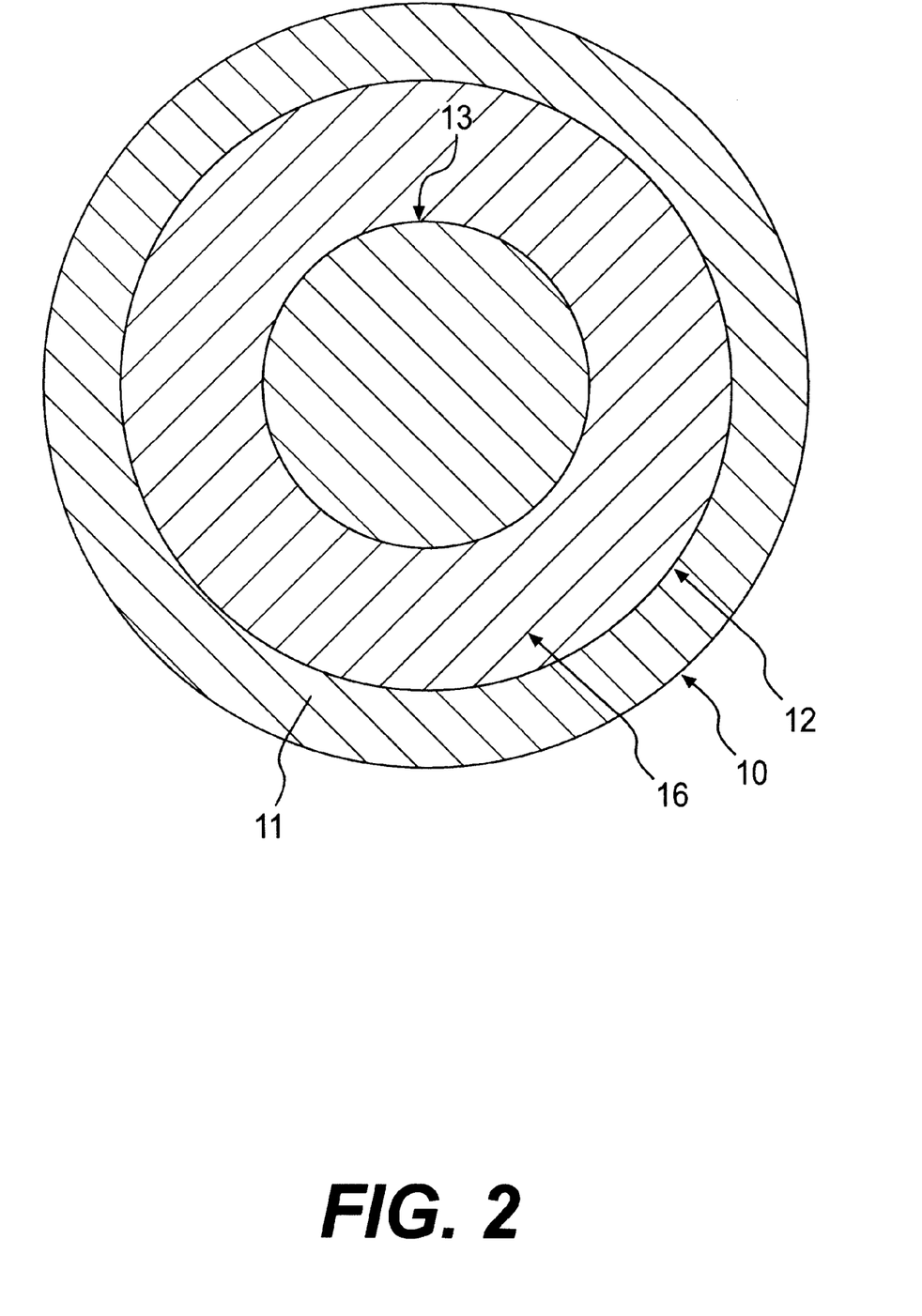
FIG. 2 is a sectional view of a completely solid ball made according to the method of the present invention.

Referring to FIGS. 1 and 2, the present invention is directed to a method of forming a multiple piece golf ball 10. More particularly, the method is directed to a method of forming a golf ball 10 having a core 12 and a cover 11, wherein the core 12 is comprised of a center 13 and an outer layer 16. As shown in FIG. 1, the center can be a liquid-filled center having a shell 15 filled with a fluid 14 or, as shown in FIG. 2, the center can be solid.

As set forth above, the present invention is primarily directed to a method of forming the outer layer 16 around the center 13 such that the center 13 is substantially concentric within the outer layer. The method of forming the centers and cover is set forth in more detail below.

Figure 3:
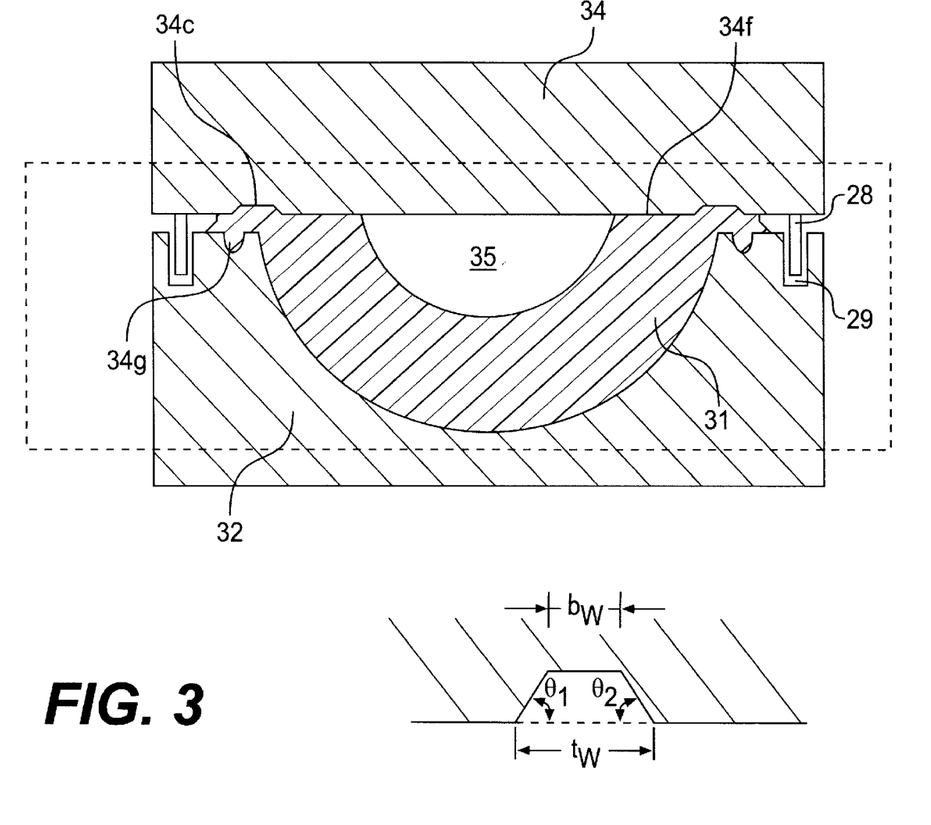
FIG. 3 is a partial, sectional view of a mold forming a single cup.
Figure 3A:
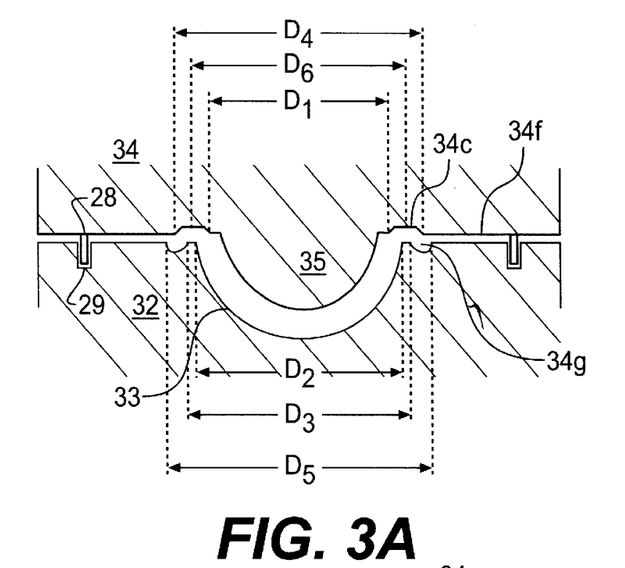
FIG. 3a is a blow-up of a portion of the mold in FIG. 3.

Referring now to FIGS. 3 and 3A, the outer layer 16 is formed by first forming hemispherical cups 31. A first cup 31 is formed as shown in FIG. 3, by compression molding cup or material, preferably polybutadiene-based elastomer, between a first substantially hemispherical concave mold part 32 having a cavity and a substantially hemispherical protrusive mold part 34. The protrusive mold part 34 has a first substantially hemispherical protrusion 35 that faces and cooperates with a cavity 33 in the first concave mold part 32. The protrusive mold part 34 includes a plurality of alignment pins 28 that mate with a plurality of bores 29 in the concave mold part 32. As the mold parts 32 and 34 are moved toward each other to form the first cup, the pins 28 align with the bores 29 to make sure that the protrusion 35 is concentric or coaxially aligns with the cavity 33. Preferably, the protrusion 35 and cavity 33 align coaxially to form a cup-shaped cavity having a substantially uniform thickness substantially equal to the thickness of the golf ball core outer layer 16. The concave mold part 32 has a circumferential groove 34g surrounding the cavity that has an inner diameter $D_3$ and an outer diameter $D_5$, the inner diameter $D_3$ being greater than the cavity diameter $D_2$. A second cup is then made in the same manner.

The protrusive mold part 34 has a channel 34c, having a depth, width, and a plurality of radii, cut into the face 34f, the channel being concentric about the hemispherical protrusion 35. The channel 34c has an inner diameter $D_1$ and an outer diameter $D_4$. The channel outer diameter, as used herein, is defined as the diameter of the circle formed by the outer sidewall of the channel. The channel inner diameter, as used herein, is defined as the diameter of the circle formed by the inner sidewall of the channel. Preferably, the channel inner diameter $D_1$ is less than the cavity diameter $D_2$ and the channel outer diameter $D_4$ is greater than the groove inner diameter $D_3$. The channel also has a center diameter $D_6$, defined as the diameter of a circle formed by the channel when measured at a point half way between the channel outer diameter $D_4$ and the channel inner diameter $D_1$. In a most preferred embodiment, the channel center diameter is substantially the same as the cavity diameter $D_2$, such that part, but not all of the channel overlaps the outer edge of the hemispherical cavity in the concave mold part 32. The overlap, in conjunction with the channel, allows controlled flow of excess cup material to the channel and formation of a polymer bridge between the cup and the excess polymer in the groove. Preferably, the channel inner diameter $D_1$ is between about 95% and 99.5% of the cavity diameter $D_2$. Alternatively, the channel outer diameter $D_4$ is between about 100.5% and 105% of the groove inner diameter $D_3$.

When the polybutadiene preps are placed in the molds and are heated and compressed to form the first or second cups, there is a tendency for the material to pull away from the mold edges as the protrusive mold part 34 is removed after molding the cup. The rim of the cavity in the concave mold part 32 and the face 34f of the protrusive mold part 34 can act as a pinch die, effectively shearing the thin layer of polybutadiene material remaining between the overflow groove and the cup. When the protrusive mold part is removed, areas of the uncured polybutadiene cup where the thin overflow layer has been sheared, pull away from the cavity edges towards the hemispherical void formerly filled by the protrusive mold part, resulting in an out-of-round cup and subsequently an improperly placed core. The channel defined by the current invention allows cup material to flow over the edges of the first concave mold part 32 during cup formation helping to maintain the structural integrity of the cup against the edges of the mold part. The channel allows excess cup material to be captured, in addition to the excess material that forms a lip extending into the groove 34g, providing structural support for the cup, diminishing the tendency of the cup inside the concave mold part 32 to pull away from the walls or to be pinched off from the excess material outside the cavity. Benefits that result from employing a channel of material to aid in keeping the cup against the walls of the concave mold part 32 include, but are not limited to, diminished cooling requirements during cup formation, better centering of the hemispherical cavity upon molding, and reduced or eliminated need of reinforcing polymer material, such as trans-polyisoprene.

Because the polymer in the channel provides physical support for the cups during molding, two differing benefits result. The first benefit is an increased molding temperature. Previous methods required limited molding temperatures because of cup pull-off at higher temperatures. The use of higher molding temperatures results in decreased cycle time (first heat, cooling, second curing heat) and lower overall energy input. The second benefit is the elimination or decrease in amounts of the reinforcing polymer material used in the cup formulations. Reinforcing polymeric material, such as polyisoprene, is typically added to aid in keeping the cups intact at the point of contact with the mold cavities. It is also a highly dampening material. The addition of the channel and subsequent physical support of the cups allows the reinforcing polymer material to be eliminated, if so desired, resulting in a faster golf ball (increased velocity). The elimination of the reinforcing polymer material, which is difficult to work with, also results in a much simpler and easier manufacturing process.

The channel has a depth ($c_d$) measured perpendicularly at a point located one-half the width from the edge of the channel from the face of the protrusive mold part 34 to the bottom of the channel. The depth is generally greater than about 0.01 inches. Preferably, the depth is from about 0.01 to 0.05 inches. More preferably, the depth is from about 0.02 to 0.03 inches. The channel has a top width ($t_w$, measured at the face 34f of the protrusive mold part 34) and a bottom width. The bottom width ($b_w$), as used herein, is defined as the width of the deepest section of the channel in which the slope of the section approaches zero and is continuous. Preferably, the top width is greater than the bottom width. More preferably, the bottom width is from about 0.1 to 0.15 inches. Most preferably, the bottom width is from about 0.12 to 0.13 inches. The bottom of the channel is preferably parallel to the plane of the face 34f of the protrusive mold part.

The channel also has a first and a second sidewall that connect the bottom of the channel to the face of the protrusive mold part 34. The sidewalls are preferably at an angle ($\theta_1$ and $\theta_2$) that is less than 90 degrees from horizontal. More preferably, the sidewall angle is from about 30 to 60 degrees from horizontal. Most preferably, the sidewall angle is between about 40 to 50 degrees from horizontal. Alternatively, the first and second sidewalls may converge at the center of the bottom of the channel such that the cross-section of the channel is triangular in shape. Additionally, the first and second sidewalls may be defined by an arc having a radius. For example, a sidewall defined by an arc having a small radius would have a tight radius of curvature whereas a sidewall defined by an arc having a large radius would have a broad radius of curvature. Preferably, the first and second sidewalls are each defined by an arc having a radius that is larger than one-half the channel bottom width. The sidewalls may also be vertical or perpendicular to the channel bottom. The angle, shape, and/or degree of the first and second sidewall do not necessarily need to be the same.

Alternatively and preferably, the two cups are simultaneously compression molded about a single protrusive mold part that has first and second protrusions. The mold part further includes non-planar surfaces, such as a tongue pattern that circumscribes the protrusions.

First and second hemispherical concave mold parts are positioned opposite each other and the protrusive mold part is placed between the concave mold parts. Alignment pins mate with the alignment bores to make sure that the protrusions are concentric or coaxially aligned with the concave mold parts. When forming the cups it is preferred that the prep includes more material than that necessary to form the cups. For example, it is preferable to use 20% more material than necessary.

The center is placed between the cups and the two cups are joined. Cups are preferably kept in their respective hemispherical molds during this step. The cups are compressed together at an elevated temperature and high pressure and the excess material of each cup flows, mixes together, and crosslinks. Since the temperature during this step is raised above the cure activation temperature of the cup material, the material crosslinks. Joining the cups may also be achieved by removing protrusive mold part and running the compression mold through a second cycle, heating and compressing the cups together.

An adhesive can be applied such that it bonds the center to the cups. The adhesive is placed within the cup cavities and the adhesive is spread evenly on the center upon joining the cups to one another. A preferred adhesive for use with polybutadiene cups is an epoxy, formed by blending low viscosity liquid resins, and formulated to be flexible in its cured state. A suitable epoxy is formed by mixing an approximately 1:1 volume ratio of about 83 parts by weight of AB-82 hardener into 100 parts by weight of Epoxy Resin #1028, both of which are sold by RBC Industries, Inc. In its liquid state, the epoxy is ideal for use in metering, mixing, and dispensing equipment. This epoxy is preferably cured at 77° F. for 18 to 24 hr, at 95° F. for 6 hr, at 120° F. for 3 hr, or at 150° F. for 1 hr. The cured adhesive's physical properties resemble those of elastomeric urethane. It exhibits an Izod impact strength 5.50 ft-lb/in of notch, a tensile strength at 25° C. of 2,200 psi, a compressive strength at 25° C. of 6,000 psi, and a Shore D hardness of 45. Preferably, the Shore D hardness of the cured adhesive is within 20 Shore D of the hardness of the elastomeric cup material.

Once the cups are joined, the cover is formed around the core by compression molding two halves of a cover around the core in a dimpled mold or injection molding the cover material around the core in a dimpled mold with retractable pins that position the core within the dimpled mold and retract before the cover solidifies or cools completely.

Figure 4:
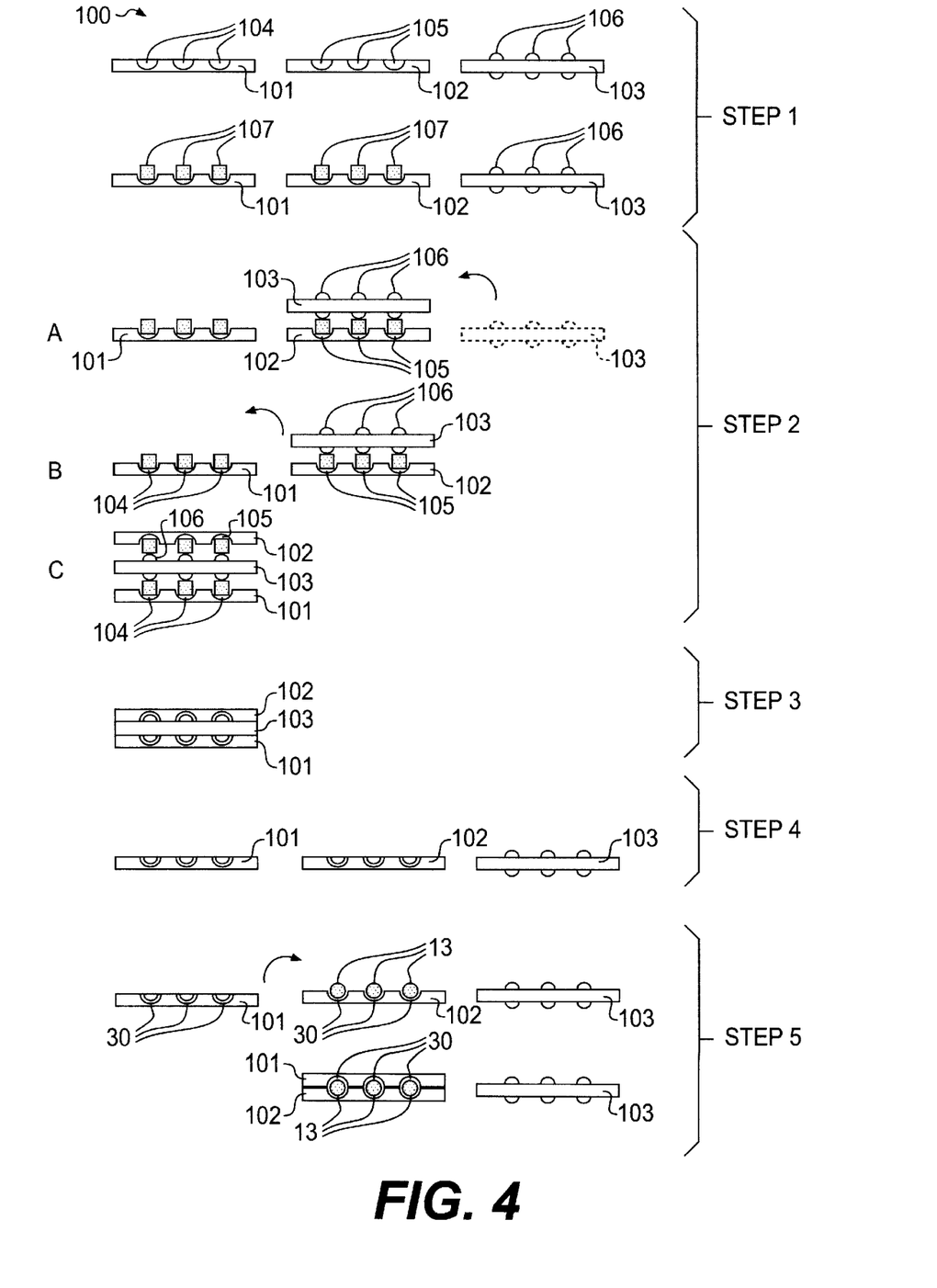
FIG. 4 is a flow chart of the method of forming a two-layer core according to the present invention.

Referring now to FIG. 4, the most preferred molding process for forming the centers uses a mold assembly 100 comprising a lower or bottom mold plate 101, an upper or top mold plate 102 and a center mold plate 103. The bottom and top mold plates 101 and 102 include a plurality of mating cavities 104 and 105 that form a sphere, which is the size of a golf ball core as set forth above. The center mold plate 103 includes a plurality of protrusions 106 on opposite sides of the center mold plate for corresponding with the cavities 104 and 105 of the top and bottom mold plates. The protrusions 106 are hemispheres that are substantially the same size as half of the ball center as set forth above.

First, as shown in Step 1, the core outer layer material 107, such as polybutadiene, is placed in the cavities 104 and 105 of the bottom and top mold plate. Then referring to Step 2A, the center mold plate 103 is moved into alignment with the top mold plate 102 such that the protrusions 106 are located in alignment or coaxial with the cavities 105. However, the center mold plate 103 is positioned over the top mold plate 102 at such a height that the polybutadiene material is only compressed enough to hold the material in place. Then, as shown in Step 2B and 2C, the center mold plate 103 and the top mold plate 102 are moved into alignment with the bottom mold plate 101 such that the protrusions 106 and the cavities 104 and 105 are all in alignment. Again, the center plate 103 is spaced from the bottom mold plate 101 such that the material in the bottom mold plate cavities 104 is only slightly compressed. Thus, a folded assembly is formed.

Once the mold assembly 100 is in position, the folded assembly is placed into a press, heated and compressed, as shown in Step 3. Preferably, the folded assembly 100 is heated to a first temperature that makes the polybutadiene material significantly more pliable, but is below the cure activation temperature. Preferably, the temperature is greater than about 150° F., but less that the cure activation temperature. The most preferred temperature is between about 190° F. and 220° F. The folded assembly 100 is compressed to a pressure sufficient enough to form hemispheres from the polybutadiene material, as shown in Step 4. Preferably, the mold assembly is compressed using a hydraulic preforming pressure of about 230 psi. Using for example, a 28-inch diameter ram for the press that produces 142,000 pounds of force on a mold with 210 cavities, the pressure per cavity is about 675 pounds of force per cavity. However, one of ordinary skill in the art can vary the pressure. The mold is then cooled with cooling water that has a temperature between about 60° F. to 100° F. and preferably the cooling water has a temperature of about 80° F.

After the outer layer material, e.g., the polybutadiene material, has been preformed into hemispheres, the mold assembly is removed from the press and the bottom mold plate 101, top mold plate 102 and the center mold plate 103 are moved out of alignment, as shown in Step 4. Then, turning to Step 5, the ball centers 13 are placed within the hemispherical cups 30 located in the top mold plate 102. The bottom mold plate 101 is moved into alignment with the top mold plate 102 such that the outer layer hemispherical cups 30 form a sphere around the ball centers 13. Then the top and bottom mold plates 101 and 102 are placed back into the press, heated and compressed again. This time, the bottom and top mold plates are heated to a temperature above the cure activation temperature of the cups. Preferably, the mold plates are heated to a temperature of greater than about 290° F. Preferably, the mold plates are compressed using a hydraulic preforming pressure of about 2000 psi. Using for example, a 28-in diameter ram for the press that produces 1,231,000 pounds of force on a mold with 210 cavities, the pressure per cavity is about 6000 pounds of force per cavity. However, one of ordinary skill in the art can vary the pressure.

Referring now to FIGS. 5–7A, the top mold plate 102 and bottom mold plate 101 are comprised of a plurality of hemispherical cavities 105 and 104. The cavities 104 and 105 are formed directly in the mold plates 101 and 102 or are comprised of replaceable mold cavities as set forth in U.S. Pat. No. 4,508,309, which issued to Brown (referred to hereafter as "the Brown patent"). The cavities 104 and 105 are formed with a radius substantially equal to the finished core radius. Preferably, this is in the range of about 1.50 inches to 1.65 in as set forth above. Surrounding each of the cavities is a circumferential groove 127 for surplus outer layer material.

Figure 7:
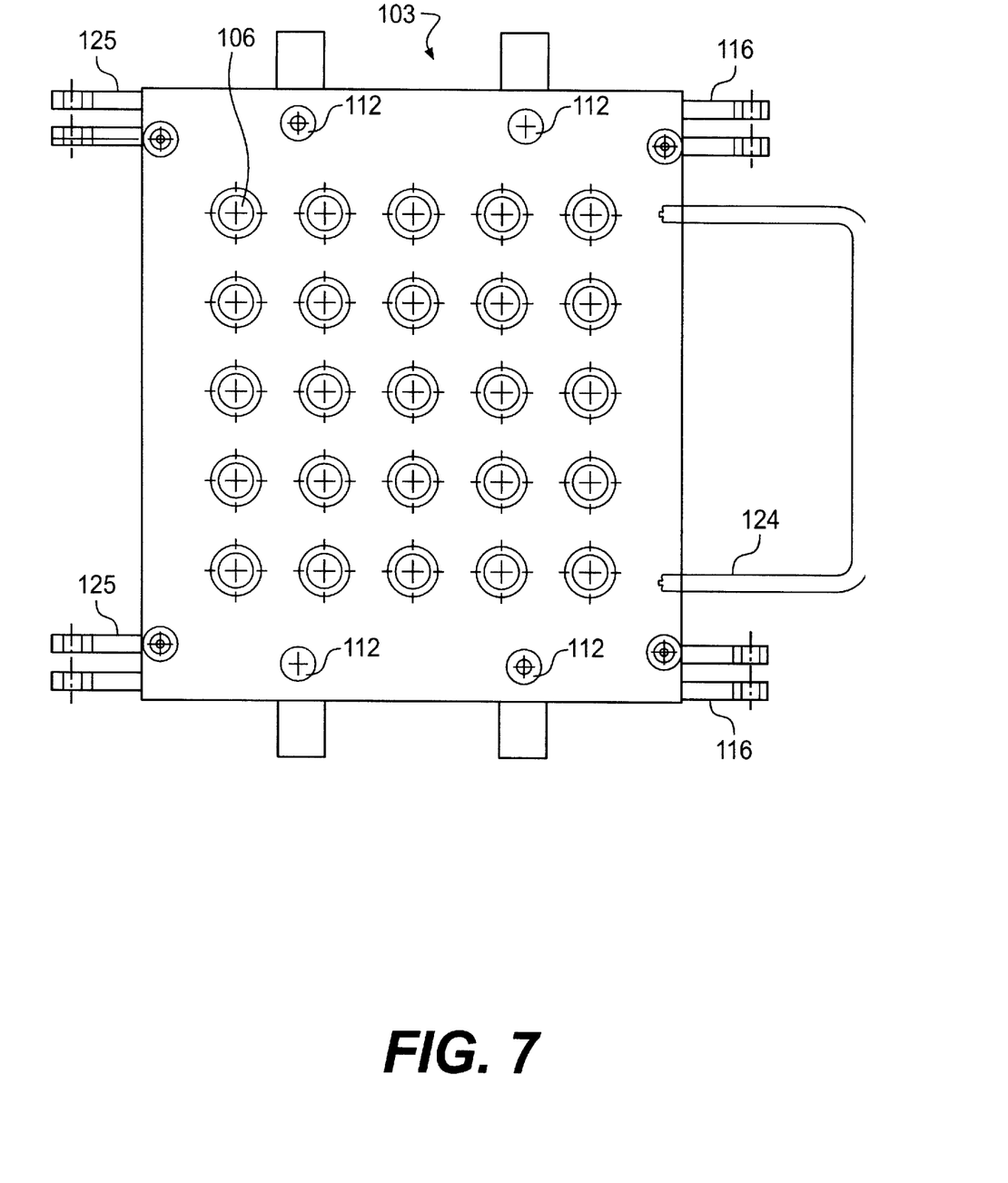
FIG. 7 is a top view of a center mold plate according to the invention.
Figure 7A:
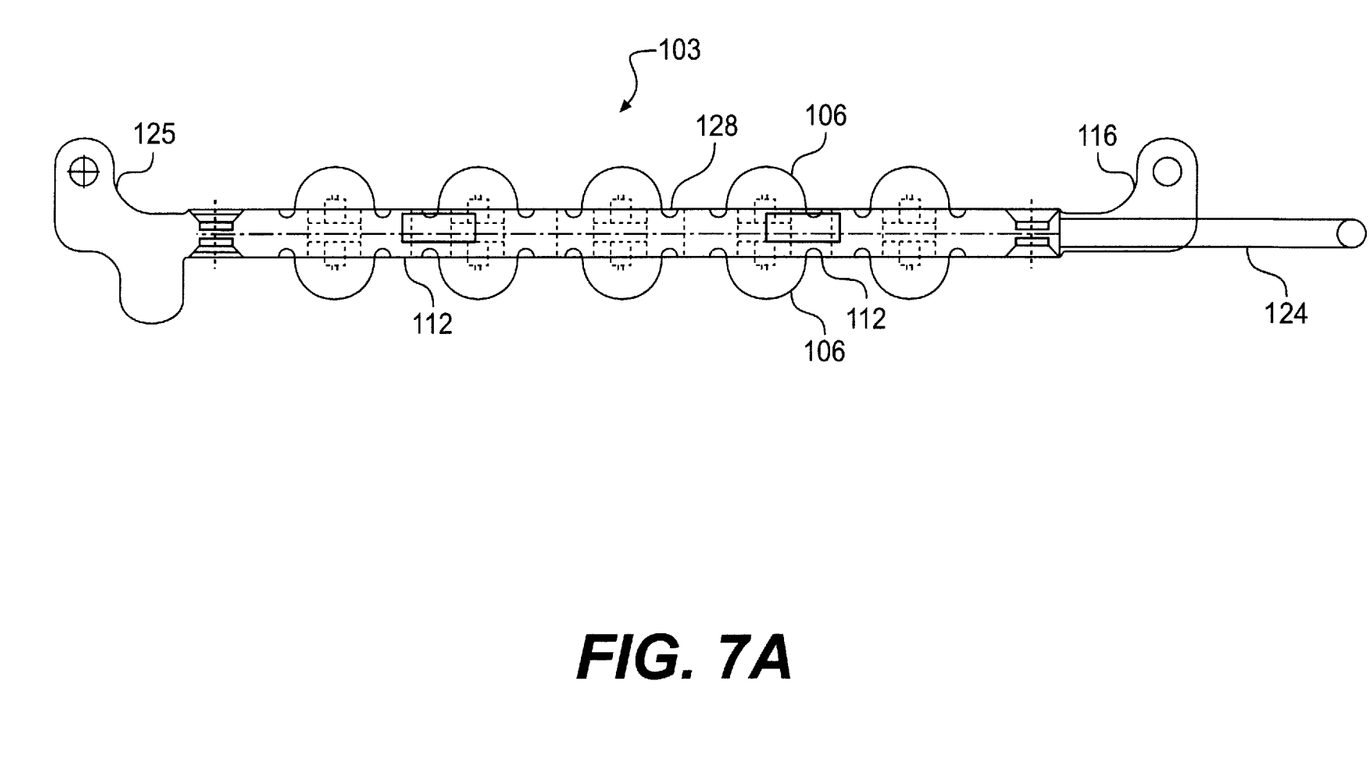
FIG. 7A is a side view of the center mold plate of FIG. 7.

The center mold plate 103 includes the protrusions or buttons 106 as set forth above. Preferably, the protrusions 106 are replaceable so that different sized cavities can be formed in the outer layer cups to accommodate different sized centers. Moreover, if the protrusions are replaceably connected to the center mold plate 103, the protrusions can be easily cleaned or replaced after wear.

Since the mold plates are movable in and out of the mold press, the mold plates do not have flow channels like that described in the Brown patent. However, the mold plates are preferably made thin to reduce thermal mass and thermal response time, i.e., the mold plates have a thickness of less that about 1.5 times the cavity radius.

Figure 5:
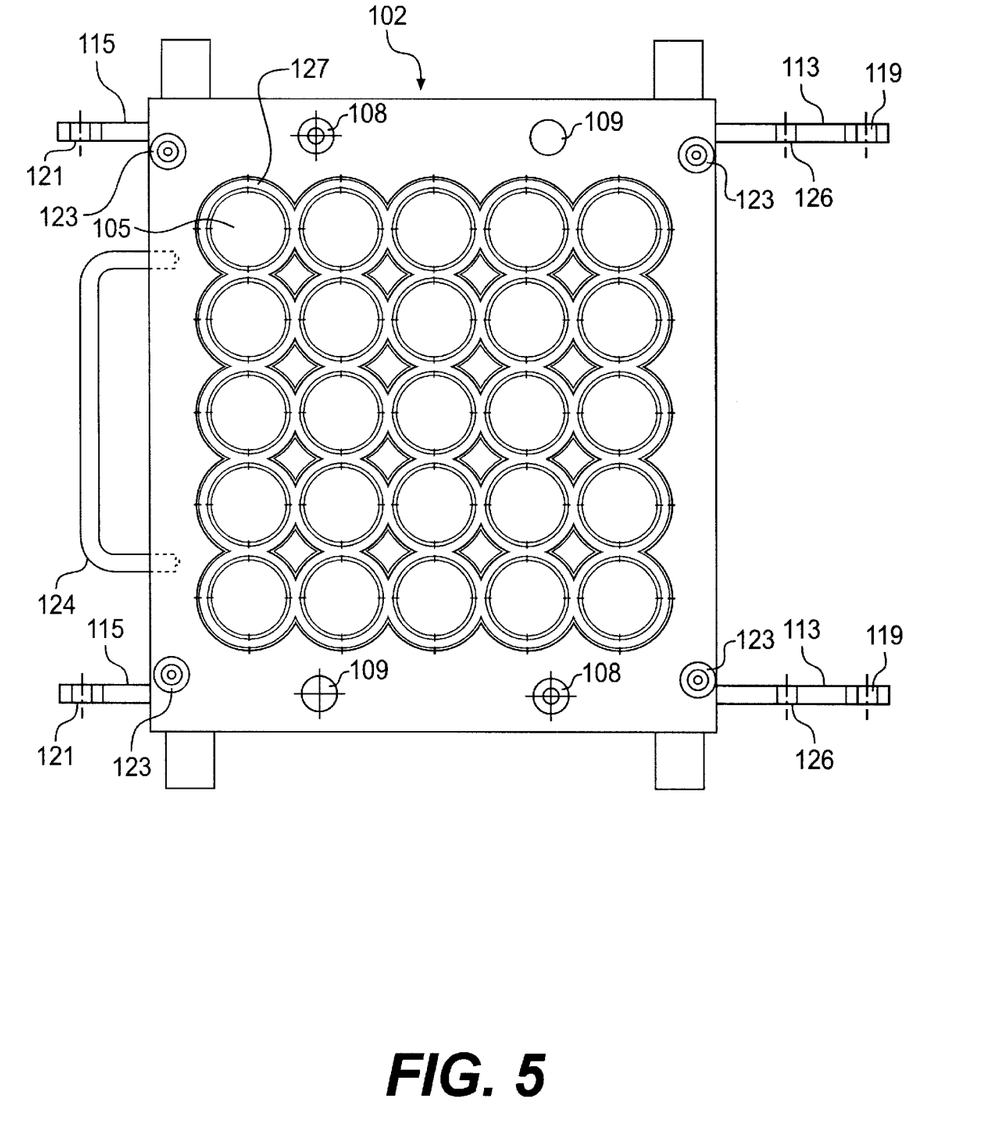
FIG. 5 is a top view of a lower mold plate according to the invention.
Figure 5A:
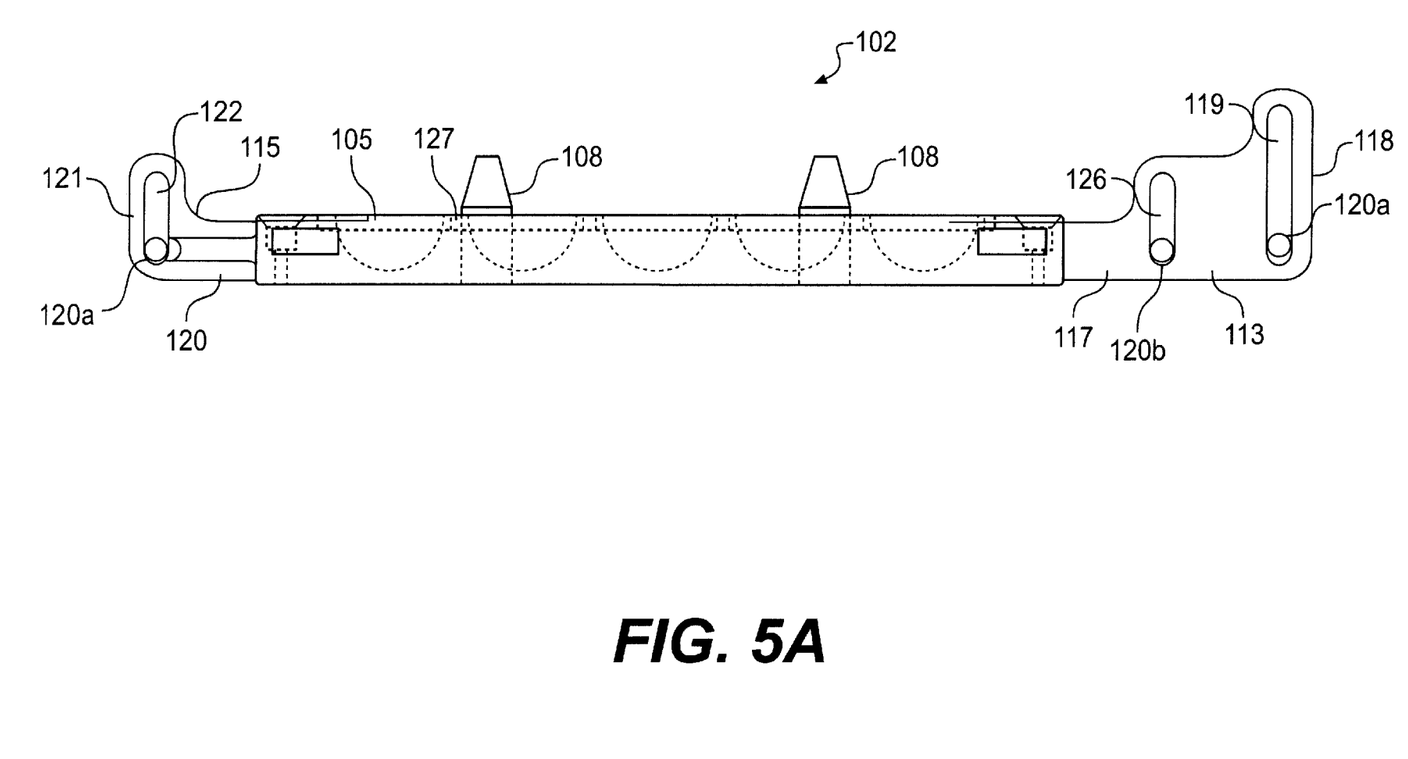
FIG. 5A is a side view of the lower mold plate of FIG. 5.

In order to position the top mold plate 102 in alignment with the bottom mold plate 101 and the center mold plate 103, the top mold plate 102 includes at least two pins 108 and at least two apertures 109 for receiving pins (best shown in FIGS. 5 and 5A). In the most preferred embodiment, there are four locations forming a rectangle on the top mold plate 102. The pins 108 are located diagonally across from each other at two of the locations and the apertures 109 are also diagonally across from each other at the other two locations. More preferably, the pin and aperture locations are positioned near the outside edge of the top mold plate 102.

Referring to FIGS. 6, 6A, 7, and 7A, the bottom mold plate 101 also includes two pins 110 and two apertures 111 located at similar positions to those on the top mold plate. Thus, when the top mold plate 102 is inverted over the bottom mold plate 101, the pins 110 insert into the apertures 109 and the pins 108 insert into the apertures 111 to position the mold plates relative to each other. The center mold plate 103 includes four apertures 112 such that when it is located between the top and bottom mold plates the pins 108 and 110 insert into the apertures 112 to properly position all of the mold plates relative to one another. The center mold plate further includes hemispherical cavities 104 and circumferential grooves 127. Referring to FIGS. 7 and 7A, the center mold plate 103 also contains a channel 128 cut into the face of the center mold plate 103 and circumferentially around a plurality of hemispherical protrusions 106.

Referring to FIGS. 5 and 5A, the top mold plate 102 includes linking arms 113 and 115 that extend laterally from the sides of the mold plate. The arms 113 include a first lateral portion 117 and a second vertical portion 118. The vertical portion 118 defines a first vertical slot 119 therein. The slot 119 has a length that is sufficient to reach the bottom mold plate 101 when the center mold plate 103 is positioned between the bottom mold plate 101 and top mold plate 102. The vertical portion 118 further defines a second vertical slot 126. The arms 115 are comprised of a first lateral portion 120 and a vertical portion 121. The vertical portion defines a vertical slot 122.

Figure 6:
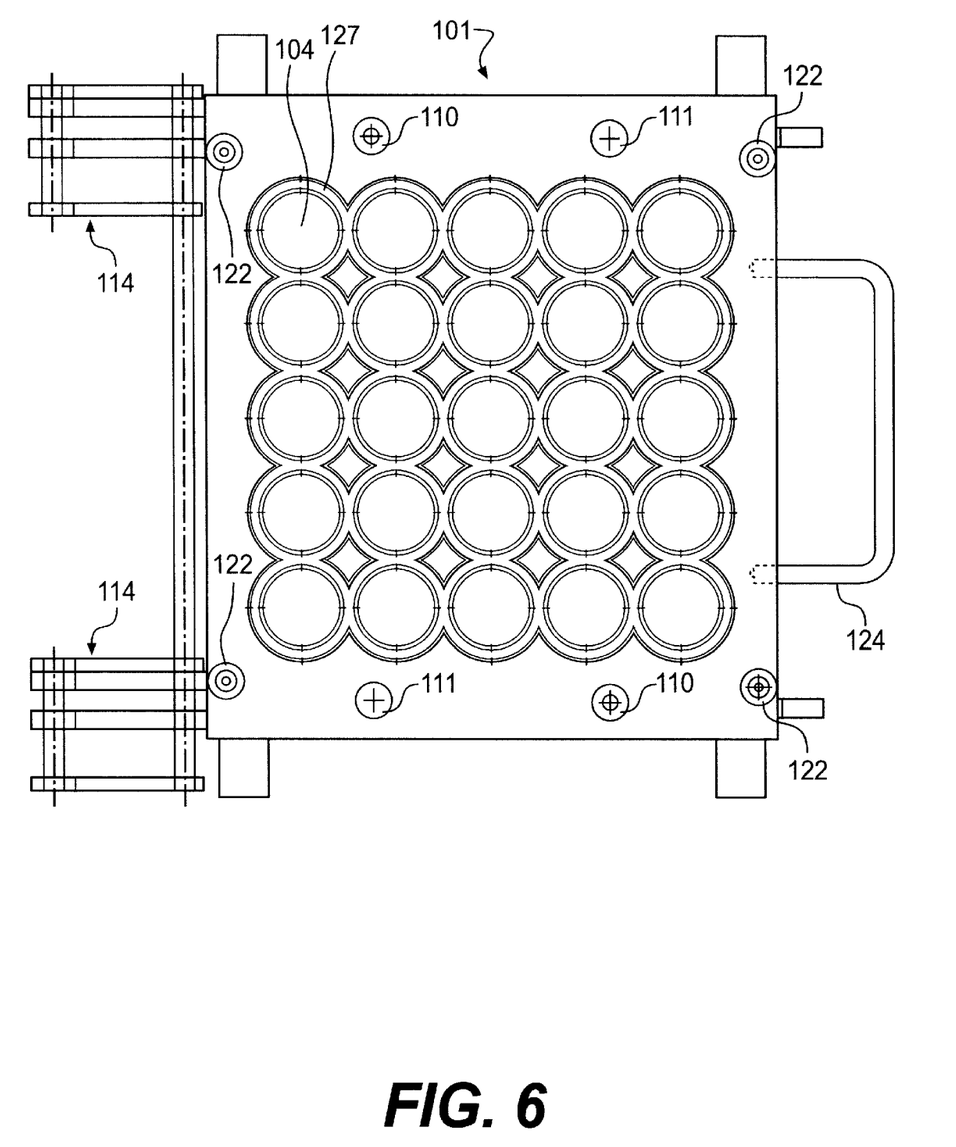
FIG. 6 is a top view of an upper mold plate according to the invention.
Figure 6A:
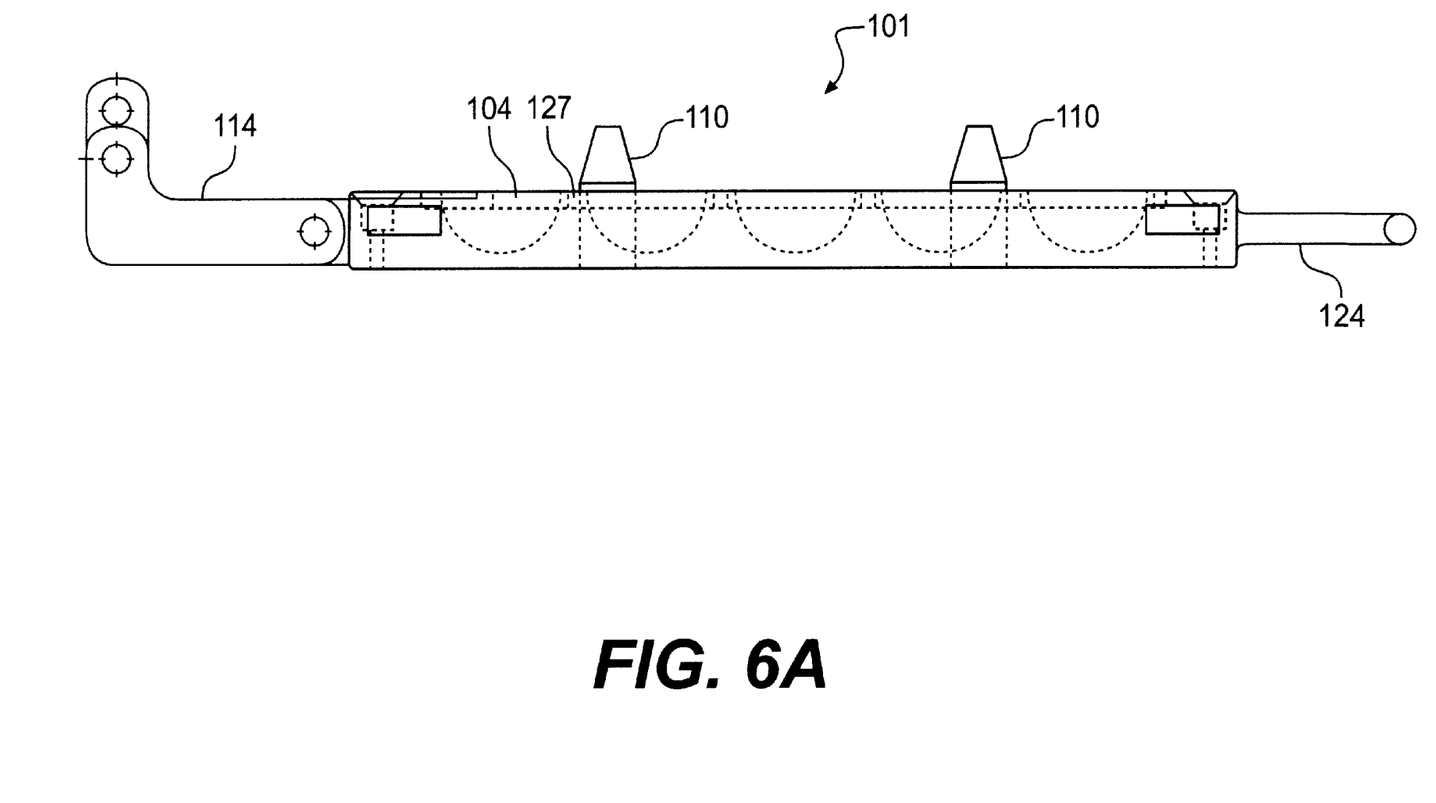
FIG. 6A is a side view of the upper mold plate of FIG. 6.

Referring to FIGS. 6 and 6A, the bottom mold plate 101 includes linking arms 114 that extend laterally from the sides of the mold plate. Referring to FIGS. 7 and 7A, the center mold plate 103 includes linking arms 116 and 125 extending laterally from opposite sides of the plate. The arms 114, 116, and 125 define apertures associated with the slots in the top mold plate 102. Referring to FIGS. 5A, 6A, and 7A, the top mold plate arms 113 are coupled to the bottom mold plate arms 114 and the center mold plate arms 125. The top mold plate arms 115 are coupled to the center mold plate arms 116. The arms are coupled using the slot 119, apertures, and pin 120a. As one of ordinary skill will understand, the slot 119 provides the coupling between the mold plates and allows for the vertical motion of the mold plates relative to each other when they are compressed during molding. When the center mold plate 103 is folded over the top mold plate 102, apertures in the arm members 125 align with the second vertical slot 126 in arm 113 and a pin 120b can be inserted therein to lock the plates together before they are folded over the bottom mold plate 101.

Referring to FIGS. 5, 6 and 7, the mold plates 101, 102 and 103 can include handles 124 to facilitate the manual insertion and retrieval from the mold press or other members that can be used for automated processes.

Referring again to FIG. 1, ball 10 includes a cover 11 and a core 12. The cover 11 is comprised of one or more layers and provides the interface between the ball 10 and a club and other objects such as trees and cart paths. Properties that are desirable for the cover are good moldability, high abrasion resistance, high tear strength, high resilience, and good mold release, among others.

The cover 11 can be comprised of polymeric materials such as ionic copolymers of ethylene and an unsaturated monocarboxylic acid, which are available under the trademark Surlyn® of E. I. DuPont De Nemours & Company of Wilmington, Del. or Iotek® or Escort from Exxon. These are copolymers or terpolymers of ethylene and methacrylic acid or acrylic acid partially neutralized with zinc, sodium, lithium, magnesium, potassium, calcium, manganese, nickel or the like.

In accordance with the preferred balls, the cover 11 has a thickness to generally provide sufficient strength, good performance characteristics and durability. Preferably, the cover 11 is of a thickness from about 0.03 inches to about 0.12 inches. More preferably, the cover 11 is about 0.04 to 0.09 inches in thickness and, most preferably, is about 0.05 to 0.085 inches in thickness.

In one preferred embodiment, the cover 11 can be formed from mixtures or blends of zinc, lithium and/or sodium ionic copolymers or terpolymers.

The Surlyn® resins for use in the cover 11 are ionic copolymers or terpolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This invention can likewise be used in conjunction with homopolymeric and copolymer materials such as:
(1) vinyl resins such as those formed by the polymerization of vinyl chloride, or by the copolymerization of vinyl chloride with vinyl acetate, acrylic esters or vinylidene chloride.
(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst.

(3) Polyurethanes such as those prepared from polyols and diisocyanates or polyisocyanates and those disclosed in U.S. Pat. No. 5,334,673.

(4) Polyureas such as those disclosed in U.S. Pat. No. 5,484,870.

(5) Polyamides such as poly(hexamethylene adipamide) and others prepared from diamines and dibasic acids, as well as those from amino acids such as poly (caprolactam), and blends of polyamides with Surlyn, polyethylene, ethylene copolymers, ethyl-propylene-non-conjugated diene terpolymer, etc.

(6) Acrylic resins and blends of these resins with poly vinyl chloride, elastomers, etc.

(7) Thermoplastics such as the urethanes, olefinic thermoplastic rubbers such as blends of polyolefins with ethylene-propylene-non-conjugated diene terpolymer, block copolymers of styrene and butadiene, isoprene or ethylene-butylene rubber, or copoly (ether-amide), such as Pebax® sold by Elf-Atochem of Philadelphia, Pa.

(7) Polyphenylene oxide resins, or blends of polyphenylene oxide with high impact polystyrene as sold under the trademark Noryl® by General Electric Company, Pittsfield, Mass.

(8) Thermoplastic polyesters, such as polyethylene terephtha late, polybutylene terephtha late, polyethylene terephthalate/glycol modified and elastomers sold under the trademarks Hytrel® by E. I. DuPont De Nemours & Company of Wilmington, Del. and Lomod® by General Electric Company, Pittsfield, Mass.

(9) Blends and alloys, including polycarbonate with acrylonitrile butadiene styrene, polybutylene terephthalate, polyethylene terephthalate, styrene maleic anhydride, polyethylene, elastomers, etc. and polyvinyl chloride with acrylonitrile butadiene styrene or ethylene vinyl acetate or other elastomers. Blends of thermoplastic rubbers with polyethylene, propylene, polyacetal, nylon, polyesters, cellulose esters, etc.

Preferably, the cover 11 is comprised of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly (tetrafluoroethylene) and their copolymers including functional comonomers and blends thereof. Still further, the cover 11 is preferably comprised of a polyether or polyester thermoplastic urethane, a thermoset polyurethane, a low modulus ionomer such as acid-containing ethylene copolymer ionomers, including E/X/Y terpolymers where E is ethylene, X is an acrylate or methacrylate-based softening comonomer present in 0–50 weight percent and Y is acrylic or methacrylic acid present in 5–35 weight percent. More preferably, in a low spin rate embodiment designed for maximum distance, the acrylic or methacrylic acid is present in 15–35 weight percent, making the ionomer a high modulus ionomer. In a high spin embodiment, the acid is present in 10–15 weigh percent or a blend of a low modulus ionomer with a standard ionomer is used.

The outer layer 16 of the core is preferably made of thermoset rubber base materials, including those conventionally employed in golf ball cores. The conventional materials for such cores include compositions having a base rubber, a crosslinking agent, a filler and a co-crosslinking agent. The base rubber is typically a synthetic rubber like 1,4-polybutadiene having a cis- structure of at least 40%. Natural rubber, polyisoprene rubber and/or styrene-butadiene rubber may optionally be added to the 1,4-polybutadiene. The initiator included in the core composition can be any polymerization initiator which decomposes during the cure cycle. The crosslinking agent includes a metal salt of an unsaturated fatty acid such as sodium, zinc, lithium or magnesium salt or an unsaturated fatty acid having 3 to 8 carbon atoms such as acrylic or methacrylic acid. The filler typically includes materials such as zinc oxide, barium sulfate, silica, calcium carbonate, zinc carbonate, regrind and the like.

Alternatively, the outer layer 16 may be comprised of thermoplastic elastomers such as a thermoplastic polyesterester, thermoplastic polyetherester, dynamically vulcanized thermoplastic elastomers, functionalized styrene-butadiene elastomers, thermoplastic urethanes or metallocene polymers or blends thereof.

The present invention is not limited to a particular outer layer 16 material, and the materials are well known to those of ordinary skill in the art. The present invention is generally directed to the use of a standard thermoset material, but those of ordinary skill in the art will easily recognize that when using thermoplastic materials, repeated heated above its melting temperature is acceptable.

The outer layer 16 preferably has an outside diameter in the range of 80 to 98% of the finished ball diameter and an inner diameter in the range of 30 to 70% of the finished ball diameter. Preferably, the outer layer 16 has an inner diameter of approximately 0.8 to 1.5 inches and, more preferably, an inner diameter of approximately 1.0 to 1.3 inches. Preferably, the outer layer 16 has an inner diameter of approximately 1.1–1.2 inches. Yet further still, the outer layer 16 has an outside diameter in the range of 1.3 to 1.7 inches and, more preferably, approximately 1.5 to 1.6 inches.

A golf ball incorporating these measurements can be designed with the various attributes discussed below, such as specific gravity, resiliency and hardness, to provide the desired playing characteristics, such as spin rate and initial velocity as set forth in U.S. Pat. No. 5,683,312 which is incorporated by reference herein.

While it is apparent that the illustrative embodiments of the invention herein disclosed fulfill the objectives stated above, it will be appreciated that numerous modifications and other embodiments may be devised by those skilled in the art, for example, a series of progressively larger diameter cups can be formed and joined by the methods disclosed. This method can also be used to form additional intermediate layers or cover layers. Therefore, it will be understood that the appended claims are intended to cover all such modifications and embodiments which come within the spirit and scope of the present invention.

What is claimed:

1. A method for making a golf ball comprising:
   forming a center;
   providing a first mold plate with a hemispherical cavity with a cavity diameter and a circumferential groove surrounding the cavity and having an inner and outer diameter, the inner diameter being greater than the cavity diameter;

providing a second mold plate with a hemispherical protrusion and a corresponding channel disposed concentrically around the protrusion, the channel having an inner diameter being less than the cavity diameter and an outer diameter greater than the groove inner diameter;

forming a first hemispherical cup from elastomeric material by:
  placing a predetermined amount of elastomeric material in the cavity of the first mold plate;
  locating the second mold plate juxtaposed the first plate;
  compressing the mold plates to form the first cup, having a substantially hemispherical cavity and lip extending into the groove;

forming a second cup in the same manner as the first cup;

placing the center in the first cup;

joining the first and second cups and removing the lip therefrom to form a substantially spherical core; and forming a cover around the core.

2. The method of claim 1, wherein the channel has a center diameter that is substantially the same as the cavity diameter.

3. The method of claim 1, wherein the channel has a depth that is greater than about 0.01 inches.

4. The method of claim 3, wherein the depth is from about 0.01 to 0.05 inches.

5. The method of claim 4, wherein the depth is from about 0.02 to about 0.03 inches.

6. The method of claim 1, wherein the channel inner diameter is between about 95% and 99.5% of the cavity diameter.

7. The method of claim 1, wherein the channel outer diameter is between about 100.5% and 105% of the groove inner diameter.

8. The method of claim 1, wherein the channel has a first and second sidewall having angles that are less than 90 degrees from perpendicular.

9. The method of claim 8, wherein the angle is from about 30 to 60 degrees from perpendicular.

10. The method of claim 9, wherein the angle is from about 40 to 50 degrees from perpendicular.

11. The method of claim 8, wherein the first and second sidewall converge in the center of the channel.

12. The method of claim 8, wherein the first and second sidewalls are each defined by an arc having a radius.

13. The method of claim 1, wherein the channel has a top width and a bottom width smaller than the top width.

14. The method of claim 13, wherein the bottom width is from about 0.1 to 0.15 inches.

15. The method of claim 14, wherein the bottom width is from about 0.12 to 0.13 inches.

16. The method of claim 1, wherein the step of joining the first and second cups further comprises elevating the temperature of at least one of the first and second cups to cause cross-linking therebetween.

17. The method of claim 1, wherein the step of joining the first and second cups further comprises adhesively attaching the first cup to the center and the second cup.

18. A method for making golf balls having multi-layer cores comprising:
  forming centers;
  providing a bottom mold plate with a plurality of hemispherical cavities having a cavity diameter and a circumferential groove surrounding each cavity having an inner and outer diameter, the inner diameter being greater than the cavity diameter;
  providing a top mold plate with a plurality of hemispherical cavities having the same cavity diameter and a circumferential groove surrounding each cavity having the same inner and outer diameter;
  providing a center mold plate with a plurality of hemispherical protrusions and a corresponding channel disposed concentrically around each protrusion, the channel having an inner diameter less than the cavity diameter and an outer diameter greater than the groove inner diameter;
  forming a plurality of core hemispherical cups from elastomeric material by:
    i) placing the elastomeric material in the cavities of the bottom mold plate and the top mold plate;
    ii) locating the center mold plate between the top mold plate and the bottom mold plate; and
    iii) compressing the mold plates to form bottom mold plate cups and top mold plate cups, wherein the bottom mold plate cups and the top mold plate cups have substantially hemispherical cavities and lips extending into the groove;
  removing the center mold plate from between the top and bottom mold plates;
  placing the centers between the top mold plate cups and the bottom mold plate cups;
  joining the top mold plate cups and the bottom mold plate cups around the centers and removing the lips therefrom to form substantially spherical cores; and
  molding at least one cover around the cores.

19. The method of claim 18, wherein the channels have a center diameter that is substantially the same as the cavity diameter.

20. The method of claim 18, wherein the channel has a depth that is greater than about 0.01 inches.

21. The method of claim 20, wherein the depth is from about 0.01 to 0.05 inches.

22. The method of claim 21, wherein the depth is from about 0.02 to about 0.03 inches.

23. The method of claim 18, wherein the channel inner diameter is between about 95% and 99.5% of the cavity diameter.

24. The method of claim 18, wherein the channel outer diameter is between about 100.5% and 105% of the groove inner diameter.

25. The method of claim 18, wherein the channels have a first and second sidewall having angles that are less than 90 degrees from perpendicular.

26. The method of claim 25, wherein the angle is from about 30 to 60 degrees from perpendicular.

27. The method of claim 26, wherein the angle is from about 40 to 50 degrees from perpendicular.

28. The method of claim 25, wherein the first and second sidewall converge in the center of the channel.

29. The method of claim 25, wherein the first and second sidewalls are each defined by an arc having a radius.

30. The method of claim 18, wherein the channel has a top width and a bottom width smaller than the top width.

31. The method of claim 30, wherein the bottom width is from about 0.1 to 0.15 inches.

32. The method of claim 31, wherein the bottom width is from about 0.12 to 0.13 inches.

33. The method of claim 18, further comprising the steps of:
  coupling the bottom mold plate to the center mold plate and the top mold plate;

folding the center mold plate over the top mold plate; and folding the top mold plate and the center mold plate over the bottom mold plate.

34. The method of claim 33, wherein the step of providing the center mold plate further includes providing hemispherical protrusions that are substantially the same size.

35. The method of claim 33, wherein the step of providing the center mold plate further includes providing hemispherical protrusions that are replaceably connected to the center mold plate.

36. The method of claim 33, wherein the step of coupling the bottom mold plate further includes:

providing the top mold plate with linking arms with a lateral portion and a vertical portion defining a first vertical slot;

providing the bottom and center mold plates with linking arms defining apertures aligned with the slots; and disposing first pins through the slots and associated apertures.

37. The method of claim 18, wherein the step of compressing the mold plates further includes elevating the temperature of the elastomeric material to a first temperature less than a cure activation temperature of the material so that the material is pliable.

38. The method of claim 37, wherein the step of joining the top mold plate cups and the bottom mold plate cups further comprises elevating the temperature of the material to a second temperature greater than the cure activation temperature.

39. An apparatus for molding a sphere having a center and a shell, the apparatus comprising:

a bottom mold plate with a plurality of hemispherical cavities having a cavity diameter and a circumferential groove surrounding each cavity having an inner and outer diameter, the inner diameter being greater than the cavity diameter;

a top mold plate with a plurality of hemispherical cavities having the same cavity diameter and a circumferential groove surrounding each cavity having the same inner and outer diameter; and a center mold plate with a plurality of hemispherical protrusions and a corresponding channel disposed concentrically around each protrusion, the channel having an inner diameter being less the cavity diameter and an outer diameter greater than the groove inner diameter.

40. The apparatus of claim 39, wherein the channel has a center diameter that is substantially the same as the cavity diameter.

41. The apparatus of claim 39, wherein the channel has a depth that is greater than about 0.01 inches.

42. The apparatus of claim 41, wherein the depth is from about 0.01 to 0.05 inches.

43. The apparatus of claim 42, wherein the depth is from about 0.02 to 0.03 inches.

44. The apparatus of claim 39, wherein the channel inner diameter is between about 95% and 99.5% of the cavity diameter.

45. The apparatus of claim 39, wherein the channel outer diameter is between about 100.5% and 105% of the groove inner diameter.

46. The apparatus of claim 39, wherein the channel has a first and second sidewall having angles that are less than 90 degrees from perpendicular.

47. The apparatus of claim 46, wherein the angle is from about 30 to 60 degrees from perpendicular.

48. The apparatus of claim 47, wherein the angle is from about 40 to 50 degrees from perpendicular.

49. The apparatus of claim 46, wherein the first and second sidewall coverage in the center of the channel.

50. The apparatus of claim 46, wherein the channel has a top width and a bottom width smaller than the top width.

51. The apparatus of claim 39, wherein the channel has a top width and a bottom width smaller than the top width.

52. The apparatus of claim 51, wherein the bottom width is from about 0.1 to about 0.15 inches.

53. The apparatus of claim 52, wherein the bottom width is from about 0.12 to about 0.13 inches.

* * * * *